United States Patent Office 3,493,663
Patented Feb. 3, 1970

3,493,663
PROCESS FOR STIMULATING GROWTH
AND EGG PRODUCTION
Fred J. Klatte, San Francisco, Calif., assignor, by mesne assignments, to Corn Products Company, New York, N.Y., a corporation of Delaware
No Drawing. Filed May 27, 1966, Ser. No. 553,308
Int. Cl. A23k 1/00
U.S. Cl. 424—230                    7 Claims

ABSTRACT OF THE DISCLOSURE

The present invention describes a method for stimulating growth and improving feed efficiency in animals such as swine and poultry and stimulating egg production in laying poultry through the addition of methylene disalicylic acid to animal feeds.

---

My invention relates to the improvement of growth in animals, particularly in swine and poultry, and to the improvement of egg production in laying poultry and to an improved animal feed.

Known animal feed supplements for growth stimulation include bacitracin and bacitracin compounds such as zinc bacitracin and bacitracin methylenedisalicylate (the reaction product of bacitracin and methylene disalicylic acid, U.S. Patent 2,774,712). Such salts of bacitracin are used to facilitate recovery of bacitracin in its manufacture and to provide a stabilized form of bacitracin for subsequent use.

I have found surprisingly that methylene disalicylic acid itself stimulates growth and improves feed efficiency in animals such as swine and poultry and stimulates egg production in laying poultry.

According to my invention, animals are fed a ration containing an amount of methylene disalicylic acid effective to provide the growth and egg production improvement. A useful range of amounts of methylene disalicylic in an animal feed ration is about 0.001% to about 0.35% by weight.

The animal feed of my invention can be readily prepared by intimately admixing methylene disalicylic acid, a powder, with a conventional animal feed composition to provide a uniformly blended composition. When animals, particularly swine and poultry, are fed with the feed or ration of my invention growth, as measured in terms of average daily gain in weight, is increased and also in laying poultry egg production is increased as compared to control animals fed the same feed but without the methylene disalicylic acid.

The following table summarizes results of feeding tests on swine and shows the effectiveness of methylene disalicylic acid in stimulating growth, as demonstrated by the increase in average daily gain in weight and increased feed efficiency. In these tests, two replicates of five uniform pigs per treatment were used. The pigs were fed for six weeks.

TABLE I

| Test | Average daily gain (lbs.) | Feed conversion (lbs. feed/ lbs. gain) |
| --- | --- | --- |
| Test 1: | | |
| Basal ration only | 0.97 | 3.57 |
| Basal ration containing 200 g./ton methylene disalicylic acid (0.02%). | 1.10 | 3.34 |
| Test 2: | | |
| Basal ration only | 1.18 | 3.15 |
| Basal ration containing 25 g./ton methylene disalicylic acid (0.003%). | 1.29 | 2.75 |
| Basal ration containing 100 g./ton methylene disalicylic acid (0.01%). | 1.29 | 3.00 |
| Basal ration containing 400 g./ton methylene disalicylic acid (0.04%). | 1.17 | 3.17 |
| Test 3: | | |
| Basal ration only | 1.28 | 3.70 |
| Basal ration containing 25 g./ton methylene disalicylic acid (0.003%). | 1.37 | 3.41 |
| Basal ration containing 100 g./ton methylene disalicylic acid (0.01%). | 1.25 | 3.83 |
| Basal ration containing 400 g./ton methylene disalicylic acid (0.04%). | 1.38 | 3.81 |

The basic ration used in the above feeding tests in swine was a 16% protein ration containing about 79.5% corn, 16% soybean meal, 2.5% meat and bone scrap, 0.5% steamed bone meal, 0.7% ground limestone, 0.5% salt and 0.3% of a mineral and vitamin premix.

The following table summarizes results of feeding tests on poultry and shows the effectiveness of methylene disalicylic acid in stimulating growth. In these tests, two replicates of eight chicks were used for each treatment. The chicks were fed for fourteen days in Test 1 and for 15 days in Test 2.

TABLE II

| Test | Body weight gain (gms.) | Feed/unit gain |
| --- | --- | --- |
| Test 1 (14 days): | | |
| Basal ration only | 361 | 2.66 |
| Basal ration containing 0.24% methylene disalicylic acid (2,179 grams per ton of feed). | 378 | 2.51 |
| Test 2 (15 days): | | |
| Basal ration only | 446 | 2.98 |
| Basal ration containing 0.32% methylene disalicylic acid (2,906 grams per ton of feed). | 464 | 2.60 |

The basal ration used in the chick growth tests was composed of 61.00% ground yellow corn, 2.00% dehydrated alfalfa meal (17% protein), 21.50% soybean meal (44% protein), 4.00% fish meal (65% protein), 2.00% meat and bone scraps (50% protein), 3.00% animal fat, 1.00% dried whey, 1.00% dicalcium phosphate, 1.50% calcium carbonate, 0.40% sodium chloride, 0.02% manganese sulfate pentahydrate (70%), 0.05% methionine hydroxy analog, and 2.50% of a vitamin premix.

The following table summarizes the results of tests in laying hens and shows the effectiveness of methylene disalicylic acid in stimulating egg production. Four replicates of five hens per treatment were used.

TABLE III

| Test | Percent Egg prodn. | Feed conversion (lbs. feed per doz. eggs) |
|---|---|---|
| Test 1: | | |
| Basal ration only | 73.2 | 3.88 |
| Basal ration containing 520 p.p.m. methylene disalicylic acid (520 grams per ton of feed or 0.06%). | 75.9 | 3.71 |
| Test 2: | | |
| Basal ration only | 78.3 | 3.75 |
| Basal ration containing 520 p.p.m. methylene disalicylic acid (520 grams pert on or 0.06%). | 82.3 | 3.53 |
| Test 3: | | |
| Basal ration only | 67.5 | 4.02 |
| Basal ration containing 520 p.p.m. methylene disalicylic acid (520 grams per ton or 0.06%). | 69.5 | 3.89 |

The basal ration used in the above tests comprised 6.45% corn, 56.00% milo, 3.00% fat, 14.50% of soybean oil meal (44%), 2.00% cotton seed meal, 1.50% meat and bone scrap, 5.00% alfalfa meal, 0.01% methionine hydroxy analog, 2.5% of a vitamin premix, 6.25% ground limestone, 2.25% dicalcium phosphate, 0.35% salt and 0.10% of a trace mineral mix.

Suitable animal feed compositions with which methylene disalicylic acid can be admixed include those described in McGraw-Hill Encyclopedia of Science and Technology, McGraw-Hill Book Company, Inc., New York, vol. 1, pp. 425–427 (1960).

I claim:
1. An animal feed preparation comprising a feed ration having uniformly blended therein as a growth stimulant and feed efficiency improver an amount of methylene disalicylic acid, in the form of the free acid, in the range from about 0.001% to about 0.35% by weight of the acid based on the weight of the feed preparation.
2. The feed of claim 1 in which the feed is a swine feed.
3. The feed of claim 1 in which the feed is a poultry feed.
4. The method of stimulating the growth of swine and poultry which comprises feeding to the swine and poultry a feed supplying an amount of methylene disalicylic acid effective for growth stimulation.
5. The method of claim 4 in which the feed contains about 0.001% to about 0.35% by weight of methylene disalicylic acid.
6. The method of stimulating the production of eggs in laying poultry which comprises feeding to the poultry a feed supplying an amount of methylene disalycylic acid effective for egg production stimulation.
7. The method of claim 6 in which the feed contains about 0.001% to about 0.35% by weight of methylene disalicylic acid.

References Cited

UNITED STATES PATENTS 2,774,712  12/1956  Baron _____ 99—9 XR
3,147,120  9/1964  Caldwell _____ 99—2

OTHER REFERENCES

Chemical Abstracts, vol. 58, 1963, p. 11901d.

MAURICE W. GREENSTEIN, Primary Examiner

U.S. Cl. X.R.

99—2, 4

PO-1050
(5/69)

UNITED STATES PATENT OFFICE
CERTIFICATE OF CORRECTION

Patent No. 3,493,663          Dated February 3, 1970

Inventor(s)     Fred J. Klatte

It is certified that error appears in the above-identified patent and that said Letters Patent are hereby corrected as shown below:

Column 3, in Table 3, test 2 "pert on" should read "per ton";

Column 3, line 23 "0.01%" should be "0.10%;

Column 4, line 17 "disalycylic" should read "disalicylic".

SIGNED AND
SEALED
JUL 21 1970

(SEAL)
Attest:

Edward M. Fletcher, Jr.
Attesting Officer

WILLIAM E. SCHUYLER, JR.
Commissioner of Patents